United States Patent
Ding et al.

(10) Patent No.: US 10,776,337 B2
(45) Date of Patent: Sep. 15, 2020

(54) MULTI-DIMENSIONAL KNOWLEDGE INDEX AND APPLICATION THEREOF

(71) Applicant: International Business Machines Corporation, Armonk, NY (US)

(72) Inventors: Chengmin Ding, Chantilly, VA (US); Octavian F. Filoti, Portsmouth, NH (US); Stanley J. Vernier, Grove City, OH (US); Renee F. Decker, Brunswick, MD (US); Elinna Shek, Aldie, VA (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 16/028,604

(22) Filed: Jul. 6, 2018

(65) Prior Publication Data
US 2020/0012733 A1    Jan. 9, 2020

(51) Int. Cl.
 *G06F 16/20* (2019.01)
 *G06F 16/22* (2019.01)
 *G06F 16/901* (2019.01)
(52) U.S. Cl.
 CPC ...... *G06F 16/2272* (2019.01); *G06F 16/2264* (2019.01); *G06F 16/9024* (2019.01)
(58) Field of Classification Search
 None
 See application file for complete search history.

(56) References Cited

U.S. PATENT DOCUMENTS

| | | | |
|---|---|---|---|
| 7,555,472 B2 | 6/2009 | Craig et al. | |
| 8,407,253 B2 | 3/2013 | Ryu | |
| 9,652,530 B1* | 5/2017 | Bendersky | ............. G06F 16/35 |
| 9,704,104 B2 | 6/2017 | Nassar | |
| 2008/0270120 A1* | 10/2008 | Pestian | ................ G06F 40/117 |
| | | | 704/9 |
| 2014/0372447 A1 | 12/2014 | Cheong | |

(Continued)

OTHER PUBLICATIONS

Peter Mell, "The NIST Definition of Cloud Computing," Special Publication 800-145; Sep. 2011; pp. 1-7.

(Continued)

*Primary Examiner* — Jau Shya Meng
(74) *Attorney, Agent, or Firm* — Ingrid M Foerster; Otterstedt, Wallace & Kammer, LLP

(57) ABSTRACT

A method of augmenting a knowledge graph includes obtaining the knowledge graph, which includes entities and relationships between the entities defining respective edges, clustering the entities into knowledge domains using semantic distances determined between the entities and a threshold on the semantic distances, identifying strengths of the relationships between adjacent entities in the knowledge graph, creating knowledge chains from node pairs in the knowledge graph, including generating a minimum spanning tree using the strengths of the relationships, pruning edges from the knowledge chain using a threshold on weights corresponding to the edges, defining a first knowledge index for each of the knowledge chains, defining a second knowledge index for each of the knowledge domains, and defining a third knowledge index for the knowledge graph as a harmonic mean of a sum of the first knowledge indexes and a sum of the second knowledge indexes.

14 Claims, 7 Drawing Sheets

(56) References Cited

U.S. PATENT DOCUMENTS

| | | | |
|---|---|---|---|
| 2016/0042296 A1* | 2/2016 | Shan | G06N 3/0454 706/11 |
| 2016/0055409 A1 | 2/2016 | Majumdar | |
| 2016/0103932 A1* | 4/2016 | Sathish | G06F 16/9024 715/767 |
| 2016/0224637 A1 | 8/2016 | Sukumar | |
| 2017/0154108 A1 | 6/2017 | Kraus et al. | |
| 2017/0364850 A1* | 12/2017 | Johnston | G06Q 10/06311 |
| 2018/0060733 A1 | 3/2018 | Beller et al. | |

OTHER PUBLICATIONS

Xin Luna Dong, "Knowledge Vault: A Web-Scale Approach to Probabilistic Knowledge Fusion," Proceedings of the 20th ACM SIGKDD international conference on Knowledge discovery and data mining, Aug. 24, 2014; pp. 601-610.
Xin Luna Dong, "Knowledge-Based Trust: Estimating the Trustworthiness of Web Sources," Journal Proceedings of the VLDB Endowment VLDB Endowment Hompage archive vol. 8 Issue 9, May 2015; pp. 938-949.
Shi Zhi, "Modeling Truth Existence in Truth Discovery," Proceedings of the 21th ACM SIGKDD International Conference on Knowledge Discovery and Data Mining, Aug. 10, 2015, pp. 1543-1552.
Junji Tomita, "Calculating similarity between texts using graph-based text representation model," Proceedings of the thirteenth ACM international conference on Information and knowledge management, Nov. 8, 2004, pp. 248-249.

\* cited by examiner

MULTI-DIMENSIONAL KNOWLEDGE INDEX AND APPLICATION THEREOF

The present disclosure relates generally to cognitive computing, and more particularly to a multi-dimensional data structure enabling improved answers, with ranking, from automated artificial intelligence (AI) systems.

In the cognitive computing era, knowledge has become a commoditized asset infused into automated AI systems. Knowledge can be stored in different formats, and in recent years many knowledge stores are represented as a graph (e.g., a knowledge graph), including entities and relationships.

Knowledge Graphs may be automatically generated from a source of content. Compared with human generated knowledge, automatically generated KGs typically contain duplicated or erroneous information. Human directed knowledge management is typically described as a process following a DIKW (Data→Information→Knowledge→Wisdom) pyramid (see FIG. 3, 300). Often times, discovered knowledge (whether human directed or automatically generated) stays at Data and Information levels instead of existing as consumable knowledge. When the discovered knowledge is used along with curated knowledge (i.e., knowledge that is generated and stored following a strict knowledge acquisition process with human subject matter expert (SME) involvement, which can be considered at the Knowledge level in DIKW pyramid), these knowledge graphs contain different quantity and/or quality of knowledge. However, the current state of art knowledge graph systems lack a systematic way to define the quantity of knowledge, which is an important quality metric of the knowledge graph. For example, existing methods attempt to provide a confidence score to the knowledge stored in a knowledge base, typically using a probability/confidence of the specific information extraction (IE) technique to represent the confidence. Therefore, these methods are largely dependent on the source content or the specific IE technique. Moreover, these methods fail in cases where different IE techniques are used.

BRIEF SUMMARY

According to an embodiment of the present invention, a method of augmenting a knowledge graph includes obtaining the knowledge graph, wherein the knowledge graph includes a plurality of entities and relationships between the entities defining respective edges, clustering the entities into a plurality of knowledge domains using semantic distances determined between the entities and a threshold on the semantic distances, identifying a strength of each of the relationships between adjacent ones of the entities in the knowledge graph, creating a plurality of knowledge chains from a plurality of node pairs in the knowledge graph, including generating a minimum spanning tree using the strength of each of the relationships between the adjacent entities in the knowledge graph, pruning a plurality of the edges from the knowledge chain using a threshold on weights corresponding to the edges, defining a first knowledge index for each of the knowledge chains, defining a second knowledge index for each of the knowledge domains, and defining a third knowledge index for the knowledge graph as a harmonic mean of a sum of the first knowledge indexes and a sum of the second knowledge indexes.

According to an exemplary embodiment of the present invention, in a general purpose computer, a method for loading at least a portion of a knowledge graph into a memory of the general purpose computer, the method including obtaining a plurality of knowledge graphs, wherein each of the knowledge graphs includes a plurality of entities and relationships between the entities defining respective edges, for each of the plurality of knowledge graphs: clustering the entities into a plurality of knowledge domains using semantic distances determined between the entities and a threshold on the semantic distances; identifying a strength of each of the relationships between adjacent ones of the entities in the knowledge graph; creating a plurality of knowledge chains from a plurality of node pairs in the knowledge graph, including generating a minimum spanning tree using the strength of each of the relationships between the adjacent entities in the knowledge graph; pruning a plurality of the edges from the knowledge chain using a threshold on weights corresponding to the edges; defining a first knowledge index for each of the knowledge chains; defining a second knowledge index for each of the knowledge domains; and defining a third knowledge index for the knowledge graph as a harmonic mean of a sum of the first knowledge indexes and a sum of the second knowledge indexes, and selecting the knowledge graph from among the plurality of knowledge graphs using the third knowledge index, wherein at least the portion of the knowledge graph selected is loaded into the memory.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments may provide for:
  a multi-dimensional data structure configured as a knowledge index;
  systematic methods for measurement of the quality and quantity of knowledge graph; and
  defined measurement of a knowledge graph at different levels including a domain level, cross-domain knowledge chain and entire knowledge graph level.

These and other features and advantages of the present invention will become apparent from the following detailed description of illustrative embodiments thereof, which is to be read in connection with the accompanying drawings.

BRIEF DESCRIPTION OF THE SEVERAL VIEWS OF THE DRAWINGS

Preferred embodiments of the present invention will be described below in more detail, with reference to the accompanying drawings.

DETAILED DESCRIPTION

Figure 1:
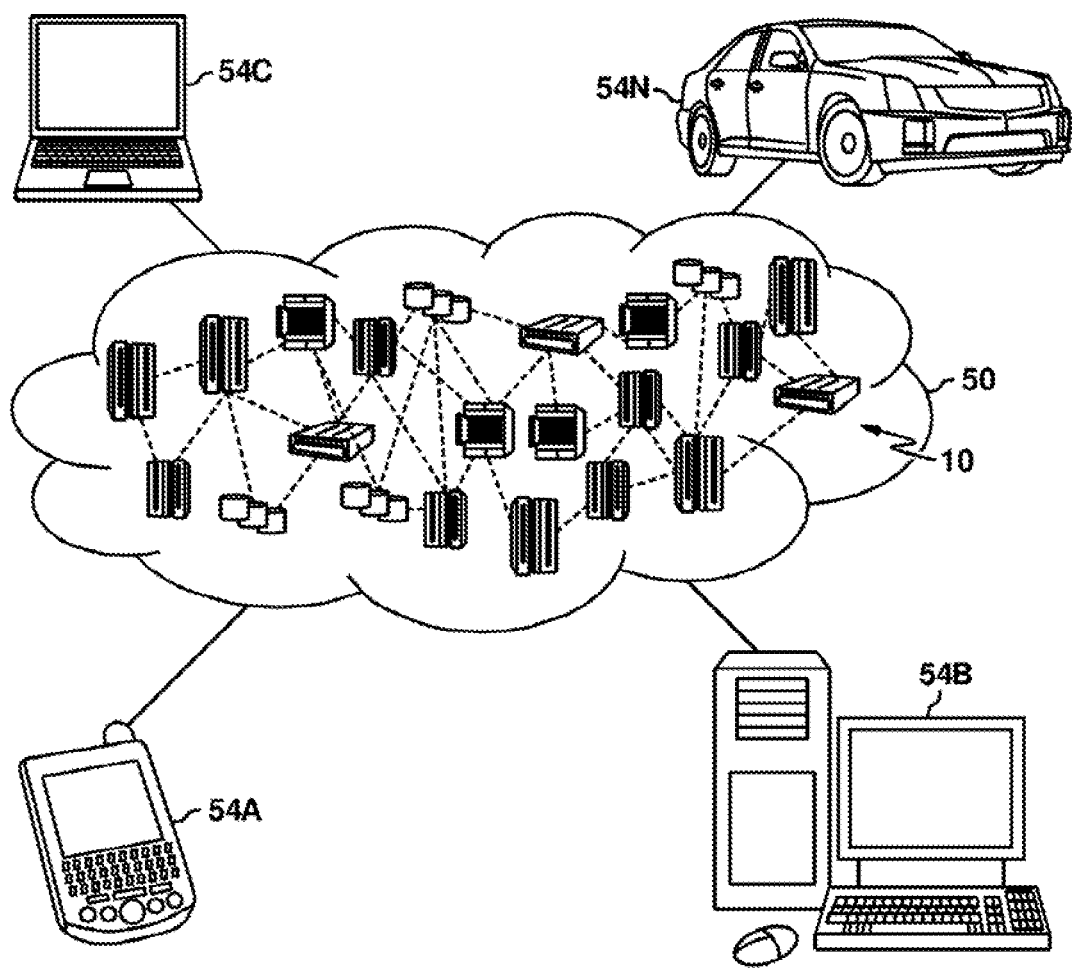
FIG. 1 depicts a cloud computing environment according to an embodiment of the present invention.

Embodiments of the present invention address the systematic measurement of the quality and quantity of a knowledge graph by introducing a non-conventional multi-dimensional data structure configured as a knowledge index. According to one or more exemplary embodiments of the present invention, the quantity of knowledge in a knowledge graph is measured, wherein the quantity is a non-obvious and novel cross-knowledge graph metric or facet. The knowledge index stores measurements of the quality and quantity of knowledge stored in a knowledge graph and enables a non-conventional comparison of different knowledge graph systems. The knowledge index enables downstream cognitive processing pipeline components to generate improved answers, and to rank the answers, particularly in the case of knowledge sources mixed between automatically discovered knowledge and curated knowledge.

According to one or more embodiments of the present invention, quantity is a cross-knowledge graph metric that makes it a valuable facet to compare the quality of different knowledge graph systems. It should be understood that quality is a broad characteristic of a knowledge graph, while quantity of knowledge is a specific metric.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
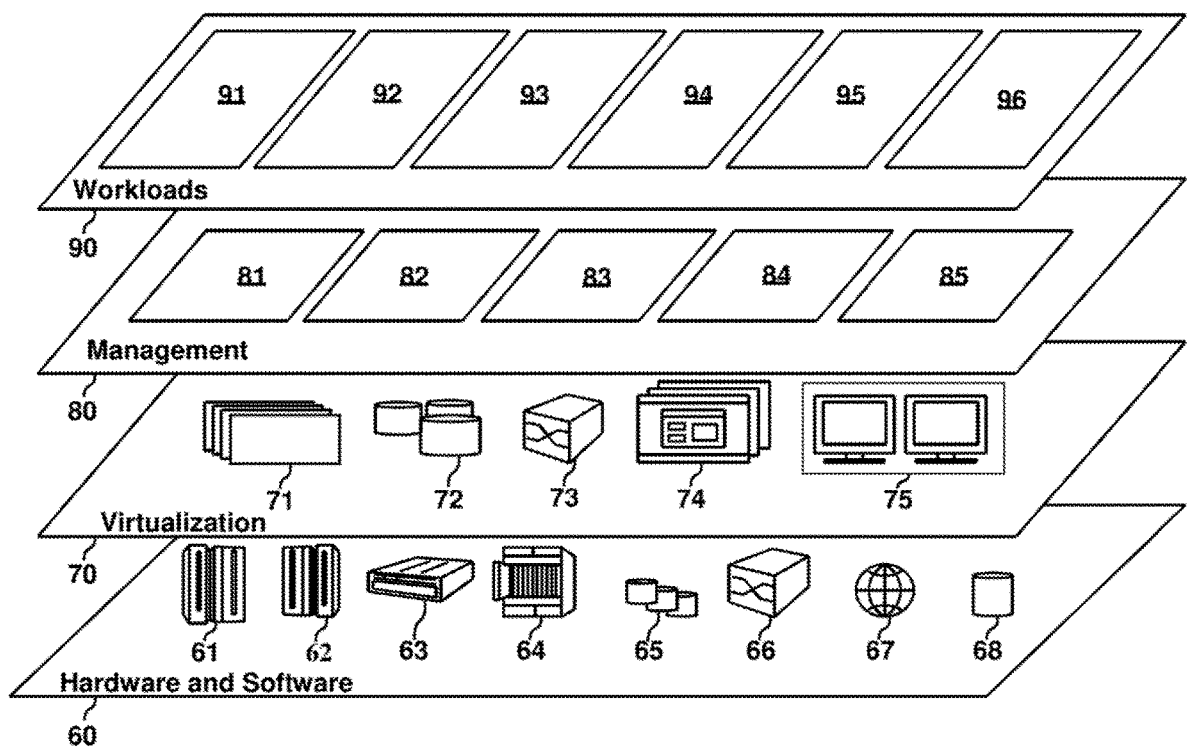
FIG. 2 depicts abstraction model layers according to an embodiment of the present invention.
Figure 3:
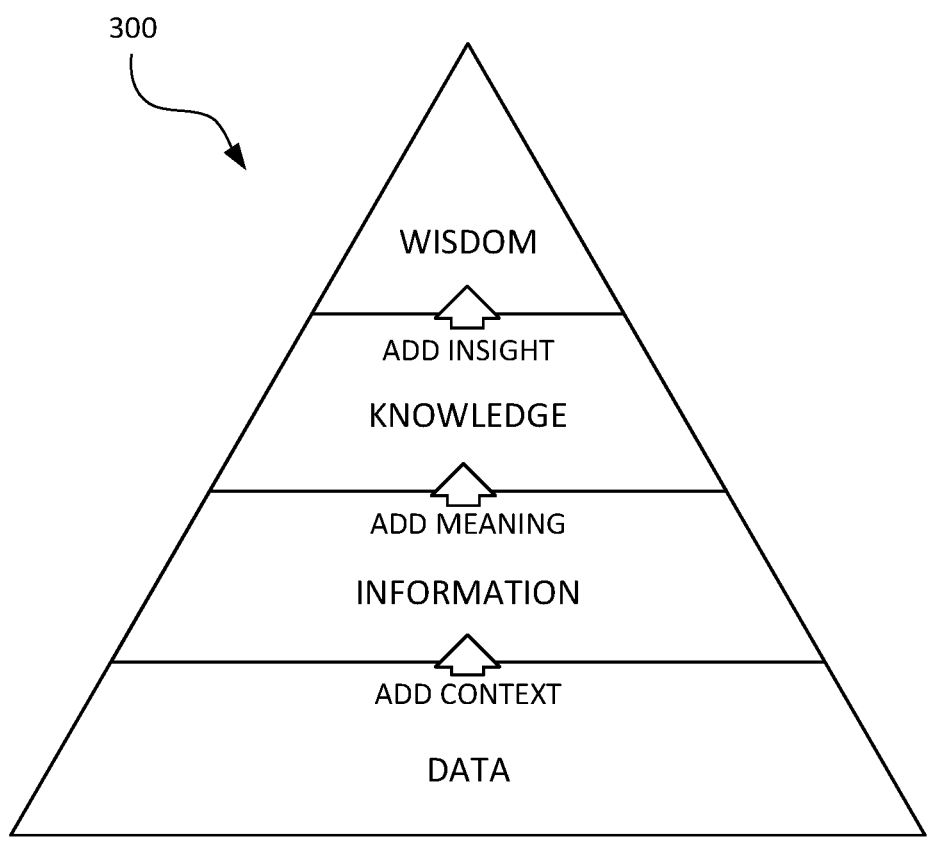
FIG. 3 depicts a DIKW pyramid.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and a multi-dimensional data structure 96 generated by a knowledge graph generator (see also, FIG. 6, block 600).

According to an embodiment of the present invention, knowledge in different knowledge graphs is systematically measured and compared. In at least one exemplary embodiment, the amount of specific knowledge is measured across multiple knowledge chains/domains within a single knowledge graph.

Currently there is no systematic mechanism to measure the "quantity" of knowledge stored in automatically generated knowledge graphs. The lack of such a mechanism makes it difficult to compare different knowledge graphs. According to one or more embodiments of the present invention, a multi-dimensional data structure encodes a knowledge index captured for each knowledge graph being investigated, where the knowledge index enables improved comparisons between knowledge graphs. According to at least one embodiment, the knowledge index enables comparisons between knowledge graphs that do not rely on information and/or fact extraction techniques that are used to build the underlying knowledge graphs. In at least one exemplary embodiment, the content and structures of a knowledge graph being investigated are used to determine a respective knowledge index. The knowledge index of the knowledge graph can be used with other techniques to collectively support downstream knowledge processing and domain adaptation.

As described herein, a knowledge graph describes real world entities and their interrelations; (ii) defines possible classes and relations of entities in a schema; (iii) allows for potentially interrelating arbitrary entities with each other; and (iv) covers various topical domains.

As described herein, a knowledge domain is a collection of entities (e.g., nodes) based on their (i.e., the entities') semantic meaning in a domain within the knowledge graph. The knowledge domain is characterized by the entities inside it, for example, a basketball domain can be characterized by the entities: Chantilly Youth League, Coach, Team, player, playoff schedule, etc. The knowledge domain is clustered based on an entity's semantic distance within a certain threshold (dThreshold). For example, in the knowledge graph 400 of FIG. 4, there are 2 domains. A first domain includes nodes 401-403 (denoted by solid circles), and a second domain includes nodes 403-409 (denoted by dashed circles). Node 403 corresponding to the term "basketball" is included in both the first and second domains. It should be understood that domains can overlap on more than one node.

Figure 4:
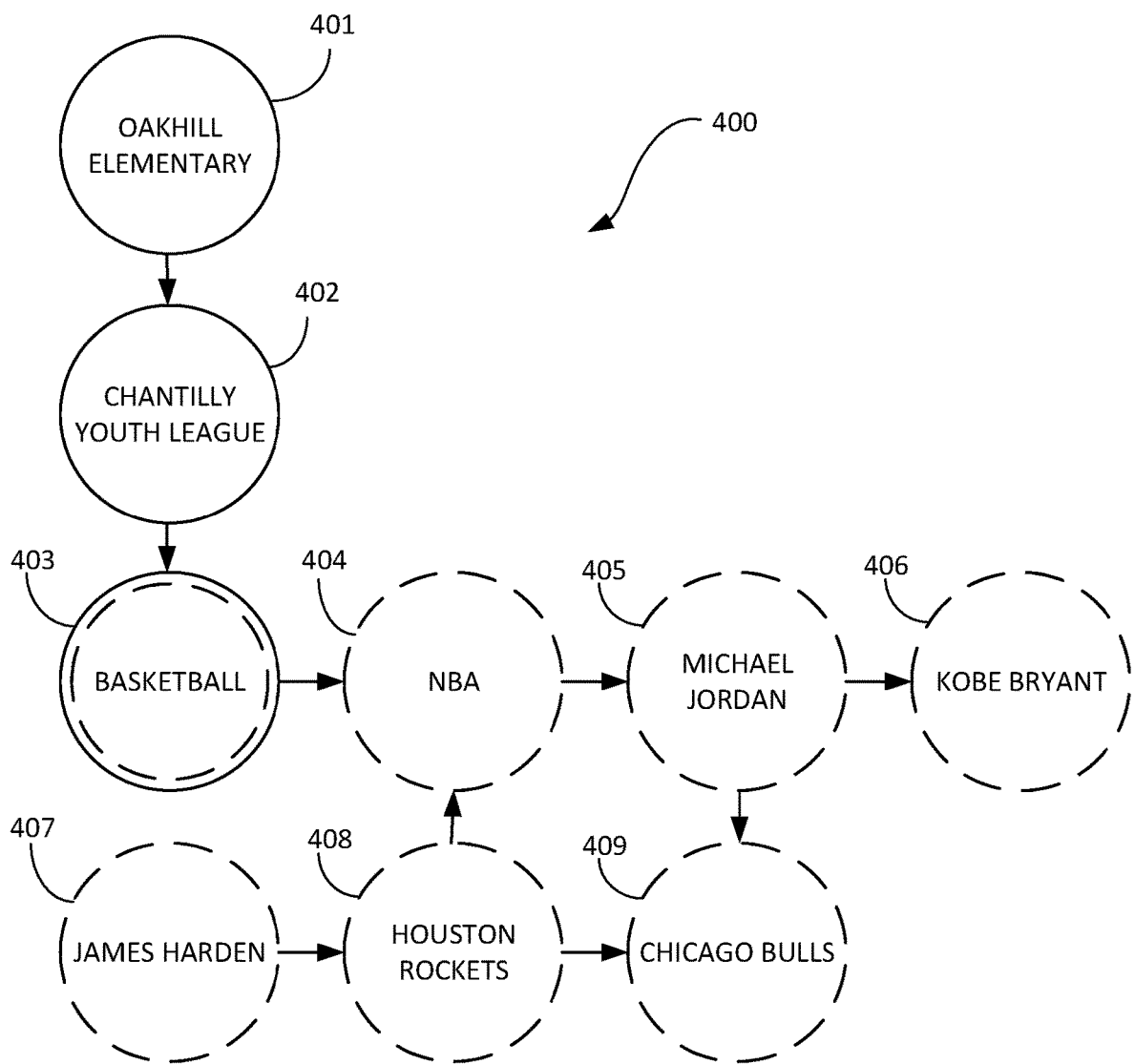
FIG. 4 depicts a knowledge domain according to an exemplary embodiment of the present invention.

As described herein, a knowledge chain is a Minimal Spanning Tree (MST) subgraph within a knowledge graph based on a certain topic or scenarios with a relation strength over a given threshold (cThreshold). In FIG. 4 there are multiple knowledge chains. For example, if there are strong relations, one chain could be Oak Hill Elementary->Chantilly Youth League->Basketball->NBA->Michael Jordan->Chicago Bull (or nodes 401-406).

As described herein, curated knowledge is generated from a structure reviewed or provided by a human (e.g., a subject matter expert). The curated knowledge is represented by entities, attributes of the entities, and relationships between the entities. The structure is a knowledge representation or building block of knowledge stored within a knowledge graph. In an exemplary knowledge graph, the structure is represented by entity1-relation-entity2. As used herein, a knowledge domain includes the entities, but not the relationship.

According to an embodiment of the present invention, a knowledge index enables comparisons of knowledge graphs having a same structure (e.g., entity1-relation-entity2 or a triple store format such as subject-verb-object). Dissimilar knowledge graphs are comparable following conversion of at least one of the knowledge graphs into a common structure.

As described herein, discovered knowledge is automatically inferred by software operating on unstructured text. Like the curated knowledge, discovered knowledge is also represented by entities, their attributes and relationships.

According to an exemplary embodiment of the present invention, the knowledge index is calculated per knowledge graph, knowledge domain or knowledge chain.

Herein, reference is made to knowledge graphs as "KG," knowledge domains as "kDomain," knowledge chains as "kChain" and knowledge indices "KI."

Figure 5:
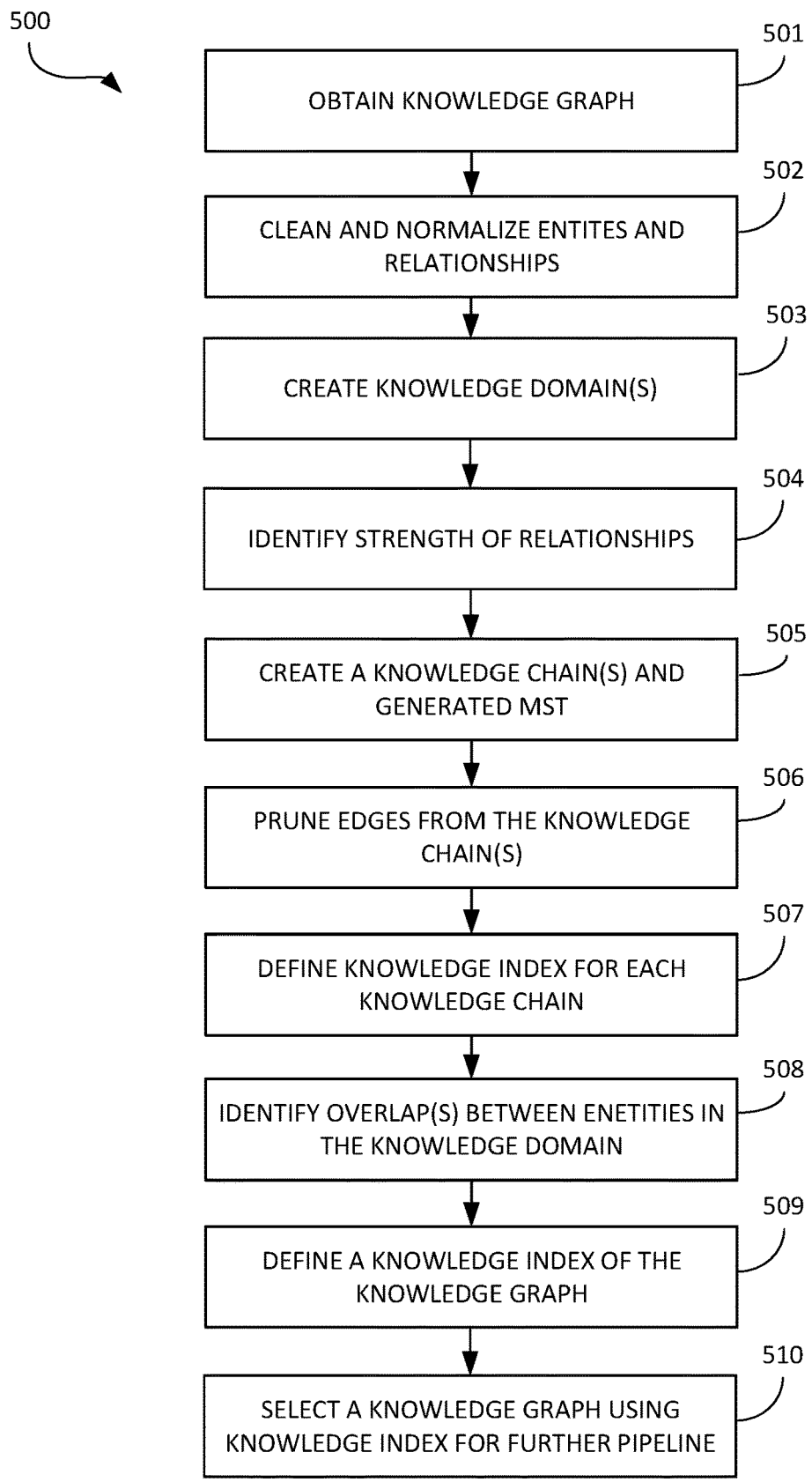
FIG. 5 depicts a method for generating a knowledge index of a given knowledge graph according to an exemplary embodiment of the present invention.

According to an embodiment of the present invention, a knowledge graph level knowledge index is one single scala value (see also the description of FIG. 5, block 509). According to an embodiment of the present invention, a knowledge domain level knowledge index is a linked list of key/value pairs in the form of [(kChain1,KI1), (kChain2,KI2), . . . (kChain3,KI3), (kChainm,KIm)] where m is the number of domain/clusters in the knowledge graph. According to an embodiment of the present invention, a knowledge chain level knowledge index is a hashmap of key/value pair in the form of [(kDomain1,KI1), (kDomain2,KI2) . . . (kDomainn,KIn)] where n is the number of knowledge chains.

According to an embodiment of the present invention, and given the measures above, the quantity of a knowledge graph can be measured at both generic and specific levels. Here, "generic" means a comparison at the knowledge graph level. For example, if KI (KG1)>KI (KG2), it shows KG1 has larger quantity of knowledge. Further, "specific" refers to comparisons of the knowledge index values between the same knowledge domain or knowledge chain. For example, if both KG1 and KG2 have a knowledge domain on basketball, KI(KG1 domain)>KI(KG2 domain) means that KG1 has more knowledge than KG2 in the specific domain (i.e., basketball). According to at least one embodiment of the present invention, the quantity of information in a data processing system is a measure of entropy, where the knowledge index is equivalent to a measure of entropy in a knowledge space.

According to an exemplary embodiment of the present invention, a method of generating a knowledge index of a given knowledge graph 500 includes obtaining (e.g., from an external source) the knowledge graph at 501. The knowledge graph includes discovered knowledge, including entities and relationships between the entities. The knowledge graph can be generated using any existing method, such as SIRE. The method further includes cleaning and normalizing the entities and relationships of the knowledge graph 502. Known methods for cleaning and normalizing entities/relationships in knowledge graph are applied here, where cleaning includes uniformly formatting data entries and normalizing includes transforming different data entries to a smaller set of values, which are more easily processed. For example, an exemplary knowledge graph having noise and conflicting information may include the following entries: "Obama"; "Barack Obama"; "Barack H. Obama"; etc., which are related to the same entity. These entries in the knowledge graph may be normalized to "Barack Obama." In another example, "Earhart-lands-Pacific Ocean" and "Earhart-lands-Gardner Island" are conflicting and may be normalized before generating knowledge Index. The cleaning and normalization reduce noise. At block 503, a knowledge domain generator clusters the entities, Ei (including their attributes, etc.), creating a plurality of knowledge domains. Each knowledge domain includes a set of clustered entities, which are clustered using the semantic distances between entities and a predefined dThreshold. One of ordinary skill in the art would understand how to select the dThreshold to achieve effective clusters in view of the present disclosure. The knowledge domains are stored in a knowledge metadata store, which effectively tags the knowledge graph with the knowledge domain information. At block 504, a relation strength calculator uses a model (e.g., a frequency based approach) to identify a strength of the relationships between adjacent neighbor entities in the knowledge graph and records the relationship strength Rij between each pair of entities Ei and Ej. In at least one exemplary embodiment, the relationship strength Rij is based on the confidence score defined in a self-adaptive system for assigning confidence scores to knowledge graph entries. At block 505, a knowledge chain generator creates a knowledge chain for each node pair (e.g., all node pairs, randomly selected nodes, Node i and Node j, etc.) in the knowledge graph (within or cross specific domains) and generates a MST based on the reverse weights (1/Rij) determined in block 504. At block 506, edges are pruned from the knowledge chain where the pruned edges have edge weights are smaller than the cThreshold, and the resulting knowledge chains are stored in the knowledge metadata store, which effectively tags the knowledge graph with the knowledge chain information. One of ordinary skill in the art would understand how to select the cThreshold to prevent low quality chains across domains in view of the present disclosure. At block 507, a knowledge index calculator defines a knowledge index for each knowledge chain as KI (kChain)=Σ(Rij), where each knowledge chain contains relationships. At block 508 the knowledge index calculator defines a KI (kDomain) as an observed overlap between the entities in the knowledge domain and a given (e.g., well-known) domain specific reference ontology (e.g., Worldnet), wherein synonyms, word senses, etc. are factors in the determination. According to at least one embodiment of the present invention, the KI (kDomain) is used as an indication of the precision and recall of the entities in the knowledge domain against some external knowledge (e.g., world knowledge, a knowledge based including information about a disease, etc.). At block 509 the knowledge index calculator defines a KI (knowledge Graph) as the harmonic mean of ΣKI (kChain) and ΣKI (kDomain).

The harmonic mean can be expressed as:

$$H = \frac{n}{\frac{1}{x_1} + \frac{1}{x_2} + \cdots + \frac{1}{x_n}} = \frac{n}{\sum_{i=1}^{n} \frac{1}{x_i}} = \left(\frac{\sum_{i=1}^{n} x_i^{-1}}{n}\right)^{-1}.$$

Here, the harmonic mean H, is determined given real numbers $x_1, x_2, \ldots x_n$. At block 509 three harmonic means are determined, including for the overall KC (denoted as KI(KC)), the overall KD (denoted as KI(KD)), and the overall KG (denoted as KI(KG)), where these values are determined as follows:

KI(KC)=n/(1/KI(KC1)+1/KI(KC2)+ . . . 1/KI(KCn))—assuming n knowledge chains

KI(KD)=m/(1/KI(KD1)+1/KI(KD2)+ . . . 1/KI(KDm))—assuming m knowledge domains

KI(KG)=2/(1/KI(KC)+1/KI(KD))=2*KI(KC)*KI(KD)/(KI(KC)+KI(KD))

According to an exemplary embodiment of the present invention, the relationship strength Rij is a confidence score assigned to relationship entries in a knowledge graph by assigning respective confidence scores to relationship n-tuples in the knowledge graph, where each of the relationship n-tuples designates at least a first entity, a second entity, and a relationship between the first and second entities or a single entity and a relationship between the single entity and one or more properties of the single entity, and respective feature vectors are associated with each of the relationship n-tuples. It should be understood that other scores can be used.

According to one or more embodiments of the present invention, to avoid computation overload, a heuristic identifies the input node pairs at block 505, such that not every node pair need be considered.

Referring again to block 507 and the exemplary data structure for the knowledge graph depicted in FIG. 4, the knowledge chains are represented as linked lists kChain1 and kChain2. kChain1=Oakhill Elementary→Chantilly Youth League→Basketball→NBA→Michael Jordan→Kobe Bryant. kChain 2=James Harden→Houston Rockets→NBA→Michael Jordan. The knowledge index value for the individual knowledge chains are:

KI (kChain1)=a
KI (kChain2)=b

The knowledge index for all the knowledge chains in the knowledge graph is a hashmap [(kChain1,a),(kChain2,b)]. The knowledge domains are represented as sets, such as kDomain1 or kDomain2, where:

kDomain1=(Oakhill Elementary, Chantilly Youth League, Basketball)

kDomain2=(NBA, Michael Jordan, Kobe Bryant, James Harden, Houston Rockets, Chicago Bulls).

The knowledge index value for individual knowledge domains are:

KI(kDomain1)=a
KI(kDomain2)=b

The knowledge index for the knowledge domains in the knowledge graph is a hashmap [(kDomain1, a),(kDomain2, b)].

At block 509, the underlying knowledge graph is tagged with the knowledge domain information, knowledge chain information, etc., which enables fast and efficient characterizations of the knowledge and/or comparisons of the knowledge graph to one or more other knowledge graphs. For example, if knowledge graph A is provided by vendor A and knowledge graph B is provided by vendor B, a generated knowledge index enables an observation that knowledge graph A contains ten knowledge domains and knowledge graph B contain twenty knowledge domains. Further, it may be observed that the twenty domains in knowledge graph B have relatively low scores (i.e., knowledge index), while the ten domains of knowledge graph A have relatively high scores. The difference between the two knowledge indexes is an indication that knowledge graph A has more condensed knowledge in its' domains.

According to exemplary embodiments of the present invention, a knowledge index is a quantity metric used to compare qualities of knowledge graphs. It should be understood that the present disclosure is not limited to the indications described herein. It should also be understood in view of exemplary embodiments described herein that a combination of indications can be used in differentiating between knowledge graphs (e.g., selecting a knowledge graph for use in a subsequent pipeline, such as an artificial intelligence application—see block 510). For example, if knowledge graph A has superior knowledge index values (e.g., as compared to knowledge graph B) in a majority of its knowledge chains, then this is an indication knowledge graph A has broader knowledge spans that could be a consideration in a given usage scenario.

In view of the foregoing, it should be understood in view of exemplary embodiments described herein that blocks 507, 508 and 509 depict exemplary indications of knowledge graph quantity or knowledge indexes that are used in differentiating between knowledge graphs (block 510); other indications can be determined as alternatives to, or in addition to, the exemplary indications described in connection with blocks 507, 508 and 509.

Figure 6:
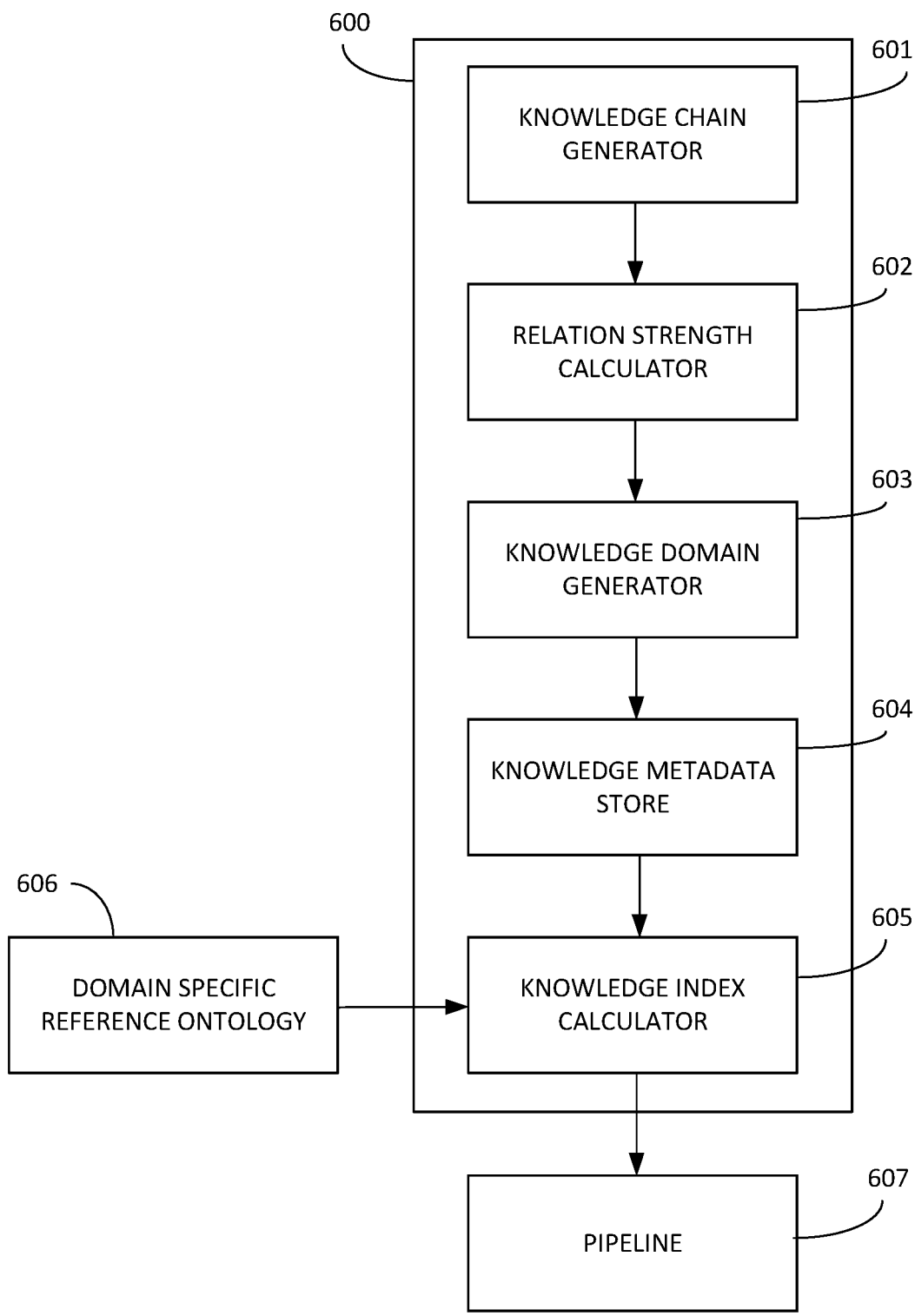
FIG. 6 depicts a software architecture according to an exemplary embodiment of the present invention.

As will be apparent in view of the foregoing, the method is performed by software 600, FIG. 6, comprising logical modules including the knowledge chain generator 601, the relation strength calculator 602, the knowledge domain generator 603, the knowledge metadata store 604, and the knowledge index calculator 605. These modules make use of one or more available domain specific reference ontologies 606. According to at least one embodiment of the present invention, the knowledge index calculator 605 outputs at least one knowledge index for each of at least two knowledge graphs, and the method includes forwarding the knowledge graphs and knowledge indexes to a further pipeline 607, where the knowledge indexes are used in selecting knowledge graphs for use in an application such as a smart assistant, question and answer system, etc. In this context, a determination of a knowledge index enables a process performed by a connected computer. According to one or more embodiments of the present invention, the ability to select between two or more knowledge graphs using knowledge indexes, for example, as a measure of the quantity of knowledge, as described here represents an improvement in the operation of a computer, for example, in the generating answers, with ranking, from an automated artificial intelligence (AI) system represented by the pipeline 510 and/or 607.

According to at least one embodiment of the present invention, a knowledge graph is augmented with a calculated knowledge index at block 605. The calculated knowledge index values for a knowledge graph, its knowledge chains and knowledge domains can be stored in an external data store (e.g., a knowledge catalog). According to an exemplary embodiment of the present invention, the knowledge catalog is a document store with structures based on JSON (see example "A" below). There are prevailing variety of techniques to query a JSON based data store for the pipeline 510 to select the right knowledge graph to use.

Exemplary knowledge catalog A:

```
{ NAME: "BASKETBALL",
    "KI": "0.78"
    "KC" : {
        {"NAME" :
        "JAMES_HARDEN_AND_KOBE_BRYANT",
            "KI": "0.08",
            "Dateupdated" : "2018-06-25",
            ...
        }
        {"NAME" : "OAK_HILL_AND_MICHAEL_JORDAN",
            "KI": "0.03",
            "Dateupdated" : "2018-06-25",
            ...
        }
        ...
    }
    "KD" : {
        {"NAME" : "BASKETBALL_YOUTH_LEAGUE",
            "KI":"0.8"
            "Dateupdated" : "2018-06-25"
            ...
        }
        {"NAME" : "NBA",
            "KI":"0.2"
            "Dateupdated" : "2018-06-25"
            ...
        }
    }
}
```

Recapitulation:

According to an embodiment of the present invention, a method of augmenting a knowledge graph includes obtaining the knowledge graph (501), wherein the knowledge graph includes a plurality of entities and relationships between the entities defining respective edges, clustering (503) the entities into a plurality of knowledge domains using semantic distances determined between the entities and a threshold on the semantic distances, identifying a strength of each of the relationships (504) between adjacent ones of the entities in the knowledge graph, creating a plurality of knowledge chains (505) from a plurality of node pairs in the knowledge graph, including generating a minimum spanning tree using the strength of each of the relationships between the adjacent entities in the knowledge graph, pruning a plurality of the edges from the knowledge chain (506) using a threshold on weights corresponding to the edges, defining a first knowledge index for each of the knowledge chains (507), defining a second knowledge index for each of the knowledge domains (508), and defining a third knowledge index for the knowledge graph as a harmonic mean of a sum of the first knowledge indexes and a sum of the second knowledge indexes (509). According to at least one embodiment of the present invention, the harmonic mean of the sum of the first knowledge indexes and a sum of the second knowledge indexes is an aggregated performance score, described above in connection with the expression KI(KG).

The methodologies of embodiments of the disclosure may be particularly well-suited for use in an electronic device or alternative system. Accordingly, embodiments of the present invention may take the form of an entirely hardware embodiment or an embodiment combining software and hardware aspects that may all generally be referred to herein as a "processor," "circuit," "module" or "system."

Furthermore, it should be noted that any of the methods described herein can include an additional step of providing a computer system for generating a knowledge index of a given knowledge graph. Further, a computer program product can include a tangible computer-readable recordable storage medium with code adapted to be executed to carry out one or more method steps described herein, including the provision of the system with the distinct software modules.

Figure 7:
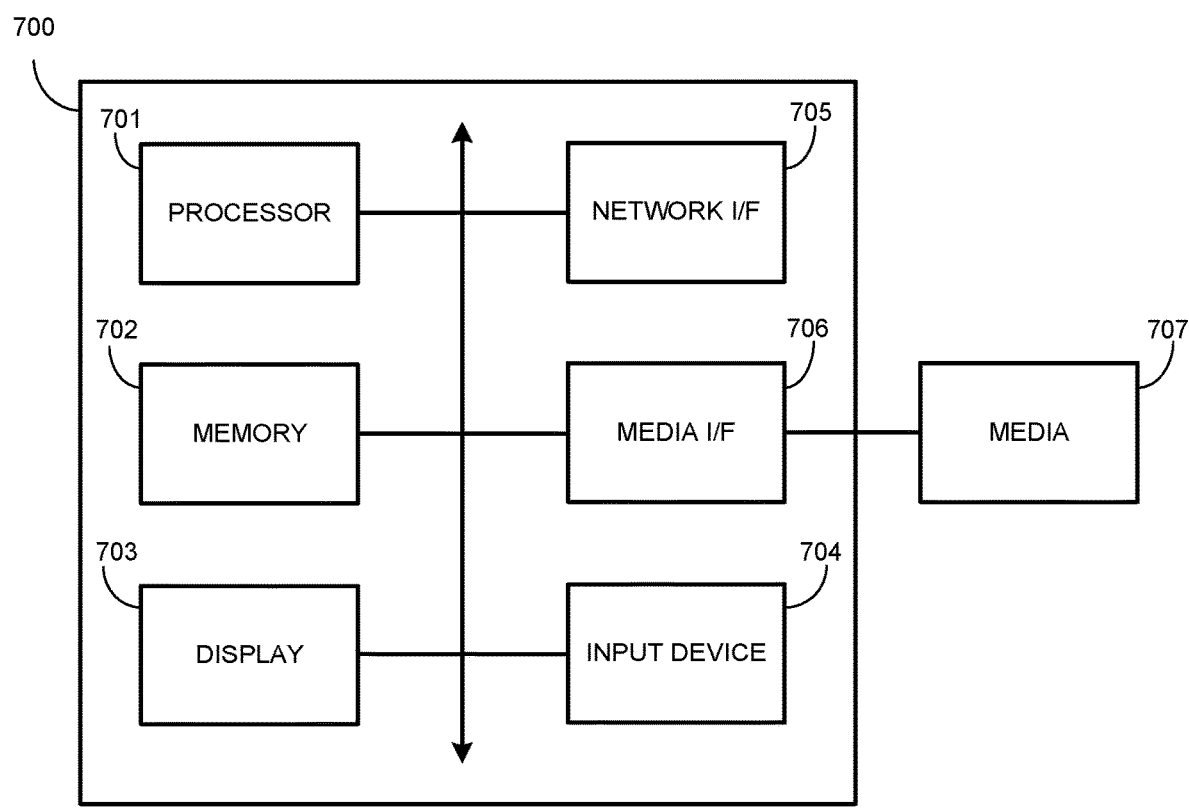
FIG. 7 is a block diagram depicting an exemplary computer system embodying a method for automated generation a knowledge index of a given knowledge graph according to an exemplary embodiment of the present invention.

Referring to FIG. 7; FIG. 7 is a block diagram depicting an exemplary computer system 700 embodying the computer system for performing automated generation of a knowledge index of a given knowledge graph. The computer system 700 shown in FIG. 7 includes a processor 701, memory 702, display 703, input device 704 (e.g., keyboard), a network interface (I/F) 705, a media I/F 706, and media 707, such as a signal source, e.g., camera, Hard Drive (HD), external memory device, etc.

In different applications, some of the components shown in FIG. 7 can be omitted. The whole system shown in FIG. 7 is controlled by computer readable instructions, which are generally stored in the media 707. The software can be downloaded from a network (not shown in the figures), stored in the media 707. Alternatively, software downloaded from a network can be loaded into the memory 702 and executed by the processor 701 to complete the function determined by the software.

The processor 701 may be configured to perform one or more methodologies described in the present disclosure, illustrative embodiments of which are shown in the above figures and described herein. Embodiments of the present invention can be implemented as a routine that is stored in memory 702 and executed by the processor 701 to process the signal from the media 707. As such, the computer system is a general-purpose computer system that becomes a specific purpose computer system when executing routines of the present disclosure.

Although the computer system described in FIG. 7 can support methods according to the present disclosure, this system is only one example of a computer system (e.g., agent system). Those skilled of the art should understand that other computer system designs can be used to implement embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of augmenting a knowledge graph comprising:
obtaining the knowledge graph, wherein the knowledge graph includes a plurality of entities and relationships between the entities defining respective edges;
clustering the entities into a plurality of knowledge domains using semantic distances determined between the entities and a threshold on the semantic distances;
identifying a strength of each of the relationships between adjacent ones of the entities in the knowledge graph;
creating a plurality of knowledge chains from a plurality of node pairs in the knowledge graph, including generating a minimum spanning tree using the strength of each of the relationships between the adjacent entities in the knowledge graph;
pruning a plurality of the edges from the knowledge chain using a threshold on weights corresponding to the edges;
defining a first knowledge index for each of the knowledge chains;
defining a second knowledge index for each of the knowledge domains; and
defining a third knowledge index for the knowledge graph as a harmonic mean of a sum of the first knowledge indexes and a sum of the second knowledge indexes.

2. The method of claim 1, further comprising, prior to the clustering, cleaning and normalizing the entities and relationships of the knowledge graph.

3. The method of claim 1, wherein defining the first knowledge index for each of the knowledge chains comprises determining a first knowledge index for each of the knowledge chains as a sum of the strengths of each of the relationships of the plurality of node pairs therein.

4. The method of claim 1, wherein defining the second knowledge index for each of the knowledge domains comprises determining a second knowledge index for each of the knowledge domains as an overlap between the entities in the knowledge domain and a given reference ontology.

5. The method of claim 1, further comprising:
comparing the third knowledge index of a knowledge index corresponding to an alternative knowledge graph; and
selecting, using the third knowledge index, the knowledge index for a subsequent pipeline.

6. In a general purpose computer, a method for loading at least a portion of a knowledge graph into a memory of the general purpose computer, the method comprising:
obtaining a plurality of knowledge graphs, wherein each of the knowledge graphs includes a plurality of entities and relationships between the entities defining respective edges;
for each of the plurality of knowledge graphs:
clustering the entities into a plurality of knowledge domains using semantic distances determined between the entities and a threshold on the semantic distances;
identifying a strength of each of the relationships between adjacent ones of the entities in the knowledge graph;
creating a plurality of knowledge chains from a plurality of node pairs in the knowledge graph, including generating a minimum spanning tree using the strength of each of the relationships between the adjacent entities in the knowledge graph;
pruning a plurality of the edges from the knowledge chain using a threshold on weights corresponding to the edges;
defining a first knowledge index for each of the knowledge chains;
defining a second knowledge index for each of the knowledge domains; and
defining a third knowledge index for the knowledge graph as a harmonic mean of a sum of the first knowledge indexes and a sum of the second knowledge indexes; and
selecting the knowledge graph from among the plurality of knowledge graphs using the third knowledge index, wherein at least the portion of the knowledge graph selected is loaded into the memory.

7. The method of claim 6, further comprising, prior to the clustering, cleaning and normalizing the entities and relationships of the knowledge graph.

8. The method of claim 6, wherein defining the first knowledge index for each of the knowledge chains comprises determining a first knowledge index for each of the knowledge chains as a sum of the strengths of each of the relationships of the plurality of node pairs therein.

9. The method of claim 6, wherein defining the second knowledge index for each of the knowledge domains comprises determining a second knowledge index for each of the knowledge domains as an overlap between the entities in the knowledge domain and a given reference ontology.

10. A non-transitory computer readable medium comprising computer executable instructions which when executed by a computer cause the computer to perform a method of augmenting a knowledge graph, the method comprising:
obtaining the knowledge graph, wherein the knowledge graph includes a plurality of entities and relationships between the entities defining respective edges;
clustering the entities into a plurality of knowledge domains using semantic distances determined between the entities and a threshold on the semantic distances;
identifying a strength of each of the relationships between adjacent ones of the entities in the knowledge graph;
creating a plurality of knowledge chains from a plurality of node pairs in the knowledge graph, including generating a minimum spanning tree using the strength of each of the relationships between the adjacent entities in the knowledge graph;
pruning a plurality of the edges from the knowledge chain using a threshold on weights corresponding to the edges;
defining a first knowledge index for each of the knowledge chains;
defining a second knowledge index for each of the knowledge domains; and
defining a third knowledge index for the knowledge graph as a harmonic mean of a sum of the first knowledge indexes and a sum of the second knowledge indexes.

11. The computer readable medium of claim 10, further comprising, prior to the clustering, cleaning and normalizing the entities and relationships of the knowledge graph.

12. The computer readable medium of claim 10, wherein defining the first knowledge index for each of the knowledge chains comprises determining a first knowledge index for each of the knowledge chains as a sum of the strengths of each of the relationships of the plurality of node pairs therein.

13. The computer readable medium of claim 10, wherein defining the second knowledge index for each of the knowledge domains comprises determining a second knowledge index for each of the knowledge domains as an overlap between the entities in the knowledge domain and a given reference ontology.

14. The computer readable medium of claim 10, further comprising:
   comparing the third knowledge index of a knowledge index corresponding to an alternative knowledge graph; and
   selecting, using the third knowledge index, the knowledge index for a subsequent pipeline.

* * * * *